(12) United States Patent
Feng et al.

(10) Patent No.: US 8,989,540 B2
(45) Date of Patent: Mar. 24, 2015

(54) DEVICE WITH MULTIPLE LIGHT SENSORS RECEIVING LIGHT SIGNALS FROM A WAVEGUIDE

(75) Inventors: Dazeng Feng, El Monte, CA (US); Wei Qian, Torrance, CA (US)

(73) Assignee: Kotura, Inc., Monetery Park, CA (US)

( * ) Notice: Subject to any disclaimer, the term of this patent is extended or adjusted under 35 U.S.C. 154(b) by 206 days.

(21) Appl. No.: 13/066,542

(22) Filed: Apr. 15, 2011

(65) Prior Publication Data

US 2012/0263410 A1    Oct. 18, 2012

(51) Int. Cl.
G02B 6/42    (2006.01)
G02B 6/43    (2006.01)
G02B 6/122   (2006.01)
G02B 6/125   (2006.01)
G02B 6/12    (2006.01)
G02B 6/10    (2006.01)

(52) U.S. Cl.
CPC .............. *G02B 6/43* (2013.01); *G02B 6/12004* (2013.01); *G02B 6/1228* (2013.01); *G02B 6/125* (2013.01)
USPC .................. 385/43; 385/14; 385/32; 385/129

(58) Field of Classification Search
CPC ....... G02B 6/0078; G02B 6/1228; G02B 6/14
USPC .......................................................... 385/43
See application file for complete search history.

(56) References Cited

U.S. PATENT DOCUMENTS

| | | | |
|---|---|---|---|
| 4,846,540 A * | 7/1989 | Kapon | 385/45 |
| 5,058,978 A * | 10/1991 | Kondoh et al. | 385/43 |
| 5,305,412 A * | 4/1994 | Paoli | 385/122 |
| 5,410,625 A * | 4/1995 | Jenkins et al. | 385/28 |
| 5,586,209 A * | 12/1996 | Matsuura et al. | 385/45 |
| 5,627,928 A * | 5/1997 | Matsuura et al. | 385/45 |
| 5,640,474 A * | 6/1997 | Tayag | 385/43 |
| 5,701,379 A * | 12/1997 | Takeuchi | 385/131 |
| 5,712,937 A | 1/1998 | Asawa | |
| 6,174,748 B1 * | 1/2001 | Jeon et al. | 438/31 |
| 6,181,860 B1 * | 1/2001 | Granestrand et al. | 385/129 |
| 6,498,337 B2 * | 12/2002 | Yasuoka | 250/214.1 |
| 6,498,873 B1 * | 12/2002 | Chandrasekhar et al. | 385/28 |
| 6,701,042 B1 | 3/2004 | Kang | |
| 6,819,839 B2 * | 11/2004 | Zheng et al. | 385/43 |
| 6,859,602 B2 * | 2/2005 | Lee et al. | 385/129 |
| 6,921,490 B1 | 7/2005 | Qian | |
| 7,120,350 B2 * | 10/2006 | Block et al. | 385/146 |
| 7,233,725 B2 * | 6/2007 | Zheng | 385/40 |
| 7,769,259 B1 * | 8/2010 | Dong et al. | 385/39 |
| 8,053,790 B2 | 11/2011 | Feng | |
| 8,093,080 B2 * | 1/2012 | Liao et al. | 438/38 |
| 8,175,432 B2 * | 5/2012 | Oikawa et al. | 385/48 |
| 8,242,432 B2 * | 8/2012 | Feng et al. | 250/227.11 |

(Continued)

*Primary Examiner* — Rhonda Peace

(74) *Attorney, Agent, or Firm* — Gavirolvich, Dodd & Lindsey, LLP

(57) ABSTRACT

The device includes a main waveguide on a base. The main waveguide is configured to guide a light signal through a light-transmitting medium. The device also includes multiple transition waveguides on the base. Each of the transition waveguide intersects a terminal end of the main waveguide such that each transition waveguide receives a different portion of the light signal from the main waveguide. The device also includes one or more light sensors positioned on the base. Each transition waveguide guides the received light portions to the one or more light sensors such that each of the light signal portions is received at the one or more light sensors.

19 Claims, 5 Drawing Sheets

(56) References Cited

U.S. PATENT DOCUMENTS

| | | |
|---|---|---|
| 8,476,576 B2 | 7/2013 | Dong |
| 8,546,899 B2 * | 10/2013 | Takabayashi ................. 257/432 |
| 2001/0053265 A1 * | 12/2001 | Yamashita et al. .............. 385/48 |
| 2003/0108294 A1 | 6/2003 | Zheng |
| 2003/0152324 A1 * | 8/2003 | Betty et al. ..................... 385/29 |
| 2004/0017975 A1 * | 1/2004 | Zheng et al. .................... 385/43 |
| 2004/0042752 A1 * | 3/2004 | Lee et al. ...................... 385/129 |
| 2006/0115200 A1 | 6/2006 | Van Der Vliet |
| 2010/0207223 A1 * | 8/2010 | Feng et al. .................... 257/432 |
| 2011/0095167 A1 * | 4/2011 | Feng et al. .................... 250/207 |
| 2011/0310467 A1 * | 12/2011 | Feng et al. ................. 359/341.1 |
| 2012/0263410 A1 * | 10/2012 | Feng et al. ...................... 385/14 |

* cited by examiner

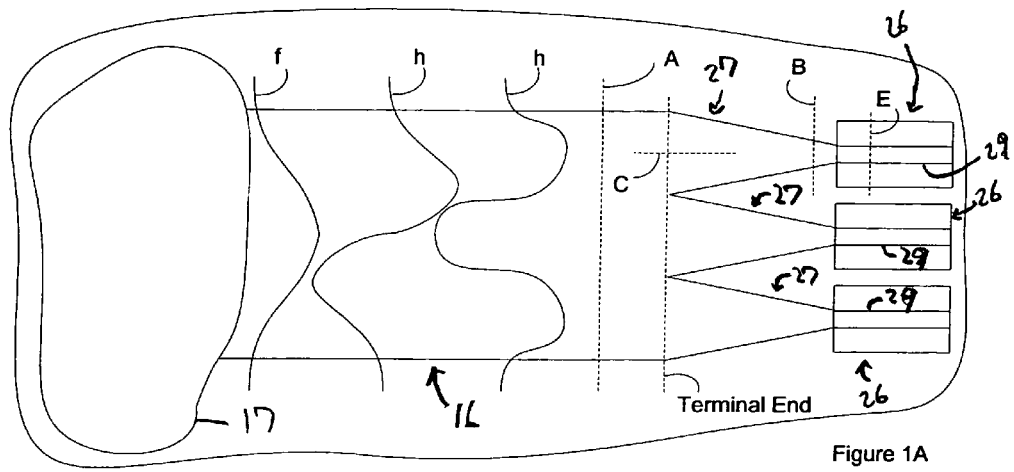
Figure 1A
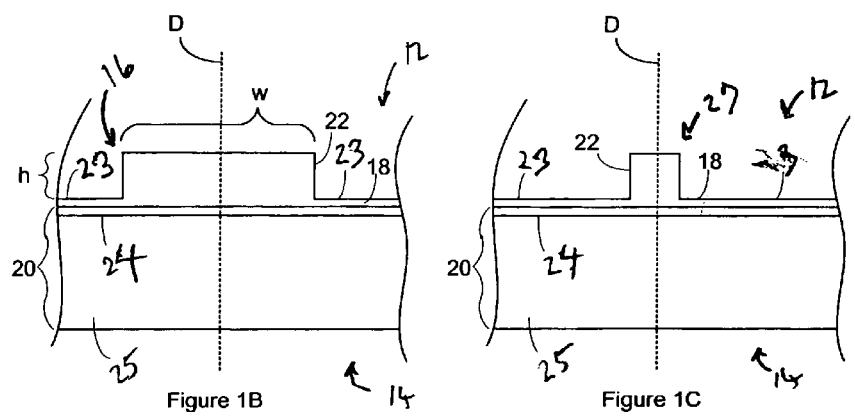
Figure 1B
Figure 1C
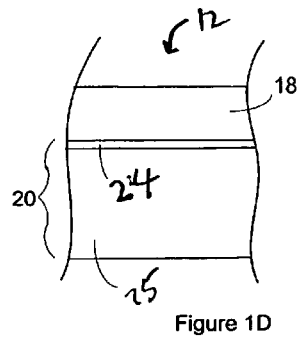
Figure 1D

DEVICE WITH MULTIPLE LIGHT SENSORS RECEIVING LIGHT SIGNALS FROM A WAVEGUIDE

FIELD

The present invention relates to optical devices and more particularly to devices having a light sensor.

BACKGROUND

The use of optical and/or optoelectronic devices is increasing in communications applications. In many of these applications it is desirable to use multimode waveguides that terminates at a light sensor that detects the presence of light in the waveguide. However, the width of a desirable variety of light sensor must be reduced in order to provide the light sensor with the desired speed. When these light sensors are used with multimode waveguides, the dimensions of the multimode waveguide often must be tapered down to dimensions that allow the light sensor to provide high speed levels. These tapers generally reduce the waveguide size from multimode to single mode. As a result, much of the higher order modes that are carried by the multimode waveguide are never seen by the light sensor. As a result, this arrangement is highly inefficient.

For the above reasons, there is a need for high speed light sensing in multimode waveguides.

SUMMARY

The device includes a main waveguide on a base. The main waveguide is configured to guide a light signal through a light-transmitting medium. The device also includes multiple transition waveguides on the base. Each of the transition waveguides intersects a terminal end of the main waveguide such that each transition waveguide receives a different portion of the light signal from the main waveguide. The device also includes one or more light sensors positioned on the base. Each transition waveguide guides the received light portions to the one or more light sensors such that each of the light signal portions is received at the one or more light sensors. In some instances, the overall effect is to increase the numerical aperture (NA) of the detector so that more of the light is captured and converted to a signal.

BRIEF DESCRIPTION OF THE FIGURES

FIG. 1A through FIG. 1A through FIG. 1E illustrate an optical device having a waveguide that terminates at multiple light sensors. FIG. 1A is a topview of the device.

FIG. 1B is a cross section of the device shown in FIG. 1A taken along the line labeled B in FIG. 1A.

FIG. 1C is a cross section of the device shown in FIG. 1A taken along the line labeled C in FIG. 1A.

FIG. 1D is a cross section of the device shown in FIG. 1A taken along the line labeled D in FIG. 1A.

FIG. 1E illustrates the light sensors of FIG. 1A connected in parallel.

FIG. 2A is a topview of the device. FIG. 2B is a cross section of the device shown in FIG. 2A taken along the line labeled B in FIG. 2A.

DESCRIPTION

The optical device includes a waveguide on a base. The waveguide terminates at multiple transition waveguides that are arranged such that each transition waveguide receives a different portion of a light signal guided by the waveguide. The device also includes one or more light sensors. The light sensors are positioned such that each of the light signal portions that is received at one of the transition waveguide is then received by the one or more light sensors.

Each of the different light signal portions exits the waveguide at a different location. As a result, each of the light sensors receives light that exits from the terminal end of the waveguide at a different location. The ability to arrange the light sensors so they receive light from a different location at the terminal end of the waveguide allows the light sensors to be arranged so a portion of the light sensors receive the fundamental mode of the light signal while another portion of the light sensors receive higher order modes. As a result, the output from the one or more light sensors includes both the fundamental mode and higher order modes. Increasing the amount of the higher order modes that are included in the output of the light sensors increases the efficiency of this output. Further, this arrangement allows the light sensors to have the narrower structure that is associated with higher speed light sensors. Accordingly, multimode waveguides can be used with efficient and high speed light sensing capabilities.

Figure 1E:
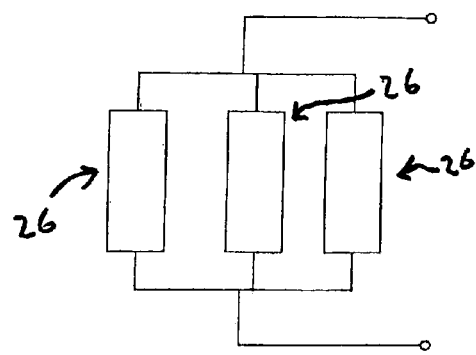

FIG. 1A through FIG. 1E illustrate an optical device having a waveguide that terminates at multiple light sensors. FIG. 1A is a topview of the device. FIG. 1B is a cross section of the device shown in FIG. 1A taken along the line labeled B in FIG. 1A. FIG. 1C is a cross section of the device shown in FIG. 1A taken along the line labeled C in FIG. 1A. FIG. 1D is a cross section of the device shown in FIG. 1A taken along the line labeled D in FIG. 1A.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides (not shown) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes a waveguide 16 that receives and guides a light signal from one or more optical components 17. The waveguide 16 can exclude free space regions where the light signal is unguided in one or more dimensions such as characterizes echelle gratings, star couplers, Rowland circles, and slab waveguides.

Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, light sensors that convert an light signal to an electrical signal, and vias that provide an optical pathway for a light signal traveling through the device from the bottom side 14 of the device to the top side 12 of the device. Additionally, the device can optionally, include electrical components. For instance, the device can include electrical connections for applying a potential or current to a waveguide and/or for controlling other components on the optical device.

The waveguide 16 is defined in a light-transmitting medium 18 positioned on a base 20. For instance, the waveguide 16 is partially defined by a ridge 22 defined by trenches 23 extending partially into the light-transmitting medium 18 or through the light-transmitting medium 18. Suitable light-transmitting media include, but are not limited to, silicon, polymers, silica, SiN, GaAs, InP and $LiNbO_3$. One or more cladding layers are optionally positioned on the light-transmitting medium. The one or more cladding layers can serve as a cladding for the waveguide 16 and/or for the device. When the light-transmitting medium 18 is silicon, suitable cladding layers include, but are not limited to, silicon, polymers, silica, SiN, GaAs, InP and $LiNbO_3$.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 can be an optical insulator 24 with a lower index of refraction than the light-transmitting medium 18. The drop in the index of refraction causes reflection of a light signal from the light-transmitting medium 18 back into the light-transmitting medium 18. The base 20 can include the optical insulator 24 positioned on a substrate 25.

As will become evident below, the substrate 25 can be configured to transmit light signals. For instance, the substrate 25 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 24 and the silicon substrate can serve as the substrate 25.

The device includes two or more transition waveguides 27 located at a terminal end of the waveguide 16. The terminal end of the waveguide 16 is located where the waveguide 16 branches into two or more transition waveguides 27 as indicated by the label "terminal end" in FIG. 1A. The terminal end need not be straight and can be curved. The transition waveguides 27 are arranged such that each of the transition waveguide 27 receives a different portion of the light signal. Since the light signal is divided up among the transition waveguides 27, each transition waveguide 27 has the same selection of wavelengths. As is evident from FIG. 1A, the portion of the light signal received by each of the transition waveguides 27 exits from the terminal end of the waveguide 16 at a different location. As a result, each light signal portion exits from the terminal end of the waveguide 16 at a different location.

The device also includes multiple light sensors. Each transition waveguide 27 guides the received light signal portion to one of the light sensors. Accordingly, each of the light sensors receives a different light signal portion. In some instances, the transition waveguide 27 each carry one of the light signal portions directly to one of the light sensors. For instance, no additional processing of the light signal portion occurs between the waveguide 16 and the light sensor. As an example, the light signal portion is not split, amplified, demultiplexed, multiplexed with another optical signal, or attenuated between the waveguide 16 and the light sensor. Additionally, the transition waveguides 27 do not intersect other optical waveguides between the waveguide 16 and the light sensor.

As noted above, the light sensor is suitable for use with waveguide dimensions that are suitable for use in communications applications. Accordingly, a suitable height for the waveguide 16 (labeled h in FIG. 1B) includes, but is not limited to, heights greater than 1 µm, 2 µm, and 3 µm. A suitable width for the waveguide 16 (labeled w in FIG. 1B) includes, but is not limited to, widths greater than 0.5 µm, 2 µm, and 3 µm. Suitable waveguide dimension ratios (width of the waveguide 16: height of the waveguide 16) include, but are not limited to, ratios greater than 0.15:1, 0.5:1, and 1:1 and/or less that 0.25:1, 1:1, and 2:1. The dimensions of the waveguide 16 can be selected such that the waveguide 16 is a single mode waveguide or a multimode waveguide.

When the waveguide 16 is a multimode waveguide, the waveguide 16 can guide several different modes of the light signal. The approximate shapes of several different light signal modes are shown in FIG. 1A. The fundamental mode is labeled "f" while two higher order modes are each labeled "h."

Prior devices using a multimode waveguide often employ a single light sensor. The waveguide would be tapered down to the dimension of that light sensor. In terms of FIG. 1A, the prior arrangement could essentially be described as tapering the entire waveguide 16 width down to the width of the middle light sensor. A review of the higher order mode shapes in FIG. 1A shows that with the prior art arrangement, the light sensor would receive primarily the fundamental mode but an undesirably low level of the higher order modes. As a result, much of the output from the higher order modes was lost. Accordingly, the output from the light sensor would be inefficient. With the arrangement illustrated in FIG. 1A, the middle light sensor receives primarily the fundamental mode; however, the outermost light sensors receive light from higher order modes. As a result, the light sensors receive more of the higher order modes than was possible in the prior arrangements.

In some instances, the light sensors are electrically connected in parallel as shown in FIG. 1E. During operation of the light sensor, an electrical field is applied across the light sensor. When one of the light sensors receives light, an electrical current flows through the light sensor. As a result, the level of electrical current through the light-absorbing medium 32 indicates receipt of a light signal. Additionally, the magnitude of the current can indicate the power and/or intensity of the light signal. Connecting the light sensors in parallel ensures that the voltage applied across each of the light sensors is the same. Further, the output of the light sensors is additive. For instance, when more than one light sensor receives a light signal, the current through each of the light sensors is additive in that the current through the nodes labeled A or B is the sum of the currents through each of the light sensors. Accordingly, when the current through the nodes labeled A or B is measured as the output of the light sensors, the output of the light sensors includes not only output from light sensors that receive the fundamental mode but also light sensors receiving higher order modes. As a result, the light sensor arrangement is more efficient than prior arrangements.

The transition waveguides 27 shown in FIG. 1A are tapered waveguide. The taper can be a horizontal taper. In some instances, the horizontal taper is an adiabatic taper. The tapered waveguides do not include a vertical taper as is evident from FIG. 1D. Although a vertical taper is not shown, a vertical taper is optional. The taper allows a light sensor to have a narrower width than that transition waveguide 27 has at the terminal end of the waveguide 16. The reduced width of the light-absorbing medium 32 increases the speed of certain light sensors. Accordingly, the taper permits the waveguide 16 to be used with high speed light sensors.

Figure 2A:
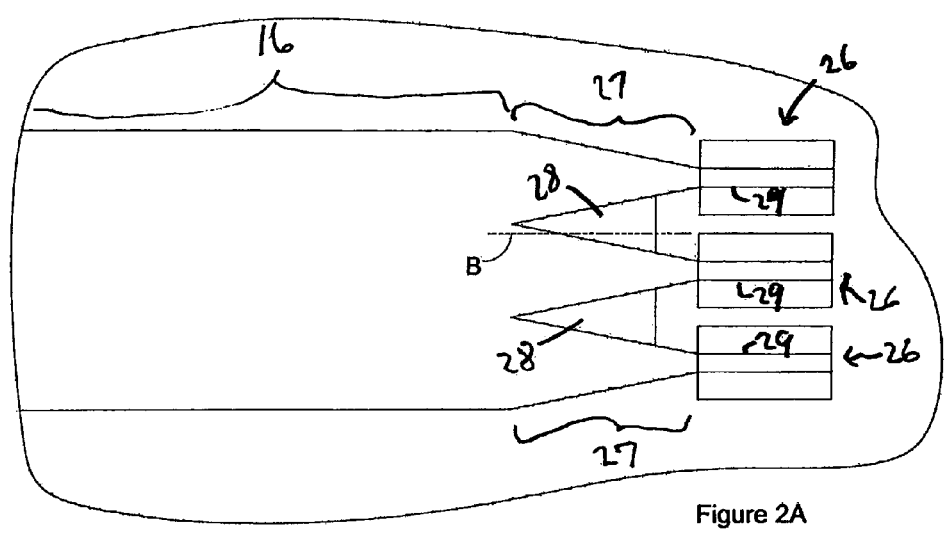
FIG. 2A through FIG. 2B illustrate another embodiment of the device.
Figure 2B:
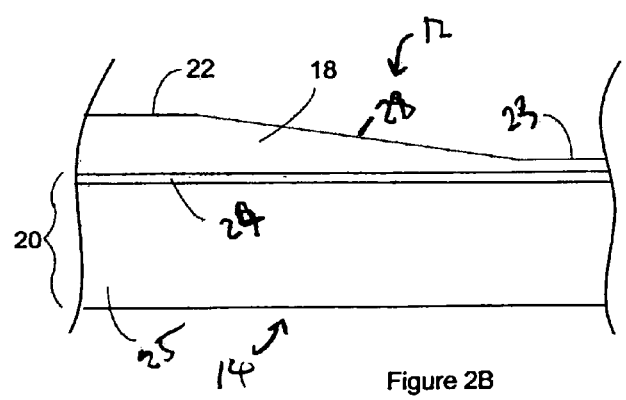

Another embodiment of the device is shown in FIG. 2A through FIG. 2B. FIG. 2A is a topview of the device. FIG. 2B is a cross section of the device shown in FIG. 2A taken along the line labeled B in FIG. 2A. The device includes vertical tapers 28 between the transition waveguides 27. More specifically, the thickness of the light-transmitting medium 18 decreases moving away from the waveguide 16. In the embodiment of FIG. 1A through FIG. 1D, portions of the light signal can be reflected by the substantially vertical interface between the ridges associated with different transition waveguides 27. Placing the taper 28 between these waveguides can reduce this reflection and can accordingly increase the portion of the light signal that is received by the light sensors. In some instances, the vertical taper is an adiabatic taper.

Other suitable structures for the taper between the transition waveguides 27 and methods of making them are disclosed in U.S. patent application Ser. No. 10/236,505, filed on Sep. 6, 2002, entitled "Optical Component Having Waveguides Extending from a Common Region," and incorporated herein in its entirety.

Figure 3:
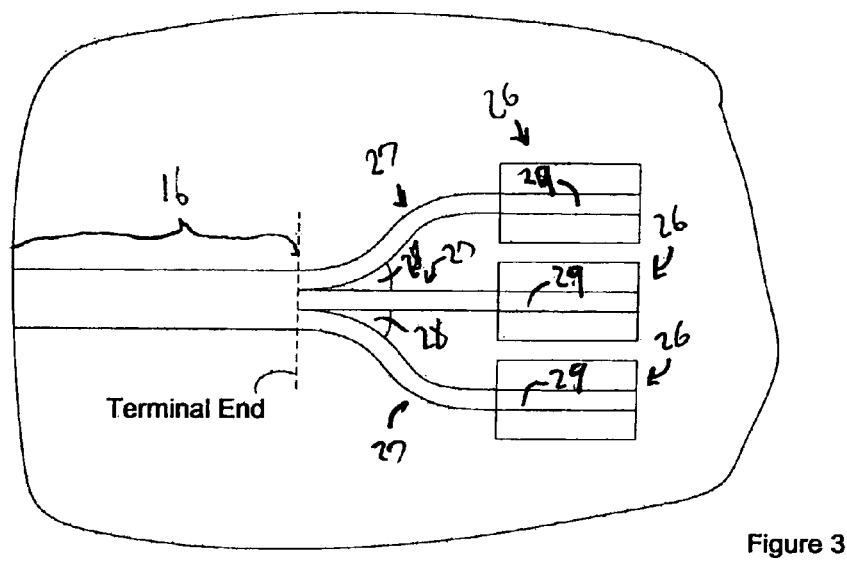
FIG. 3 is a topview of another embodiment of the device.

The transition waveguides 27 need not be tapered. For instance, FIG. 3 illustrates an embodiment where the transition waveguides 27 do not have a taper. The transition waveguides 27 separate as they travel away from the terminal end of the waveguide 16 in order to provide enough separation for the light sensors to be positioned adjacent to one another. As will become evident below, the light sensors themselves include waveguides 29 that guide the received light signal portion through a light absorbing medium. In some instances, the transition waveguides 27 of FIG. 3 have a width that is at most equal to the width of the waveguide 29 (or ridge) in the light sensor. As a result, the transition waveguides 27 can each connect a light sensor to the waveguide 16 without the use of a horizontal taper.

The device can be constructed such that opposing ends of a light sensor receive a light signal portion from more than one transition waveguide 27. For instance, FIG. 4 illustrates the waveguide 16 terminating at two transition waveguides 27.

Figure 4:
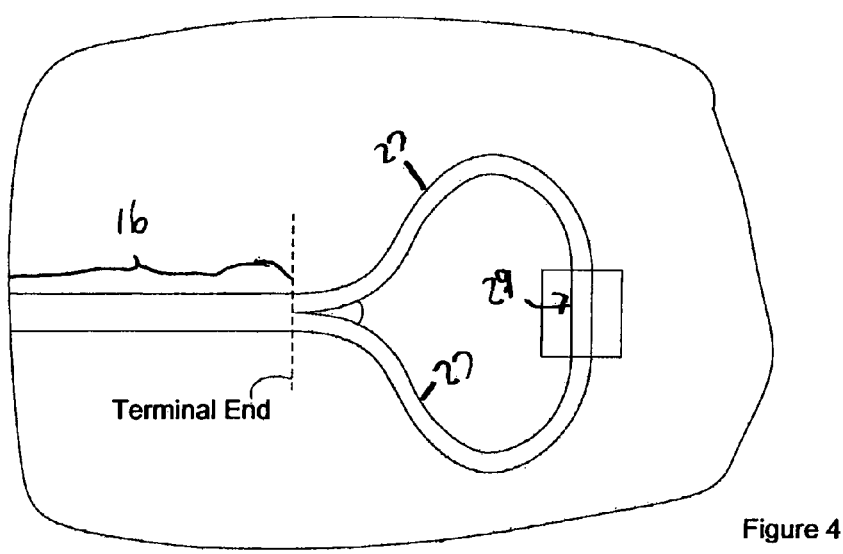
FIG. 4 is a topview of another embodiment of the device.

Although FIG. 4 shows the waveguide 16 terminating at two transition waveguides 27, the waveguide can terminate at more than two transition waveguide 27. When the waveguide terminates at 4 or more transition waveguides 27, more than one pair of transition waveguides 27 can guide their light signal portions to a single light sensor.

Although the device of FIG. 4 is shown using transition waveguides 27 without horizontal tapers, one or more of the transition waveguides 27 of a device constructed according to FIG. 4 can include horizontal tapers. In some instance, all of the transition waveguides 27 of a device constructed according to FIG. 4 can include horizontal tapers.

Although FIG. 3 and FIG. 4 illustrates a vertical taper between adjacent transition waveguides 27, the vertical taper is optional. During the operation of devices constructed according to FIG. 2A through FIG. 4, the light sensors can be connected in parallel.

Figure 5A:
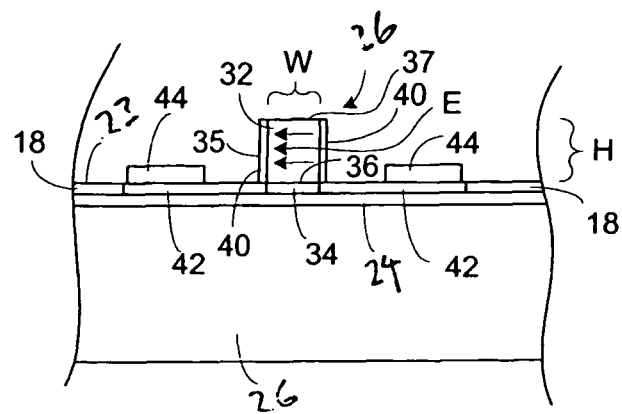
FIG. 5A through FIG. 5C are cross sections of different embodiments of the device.

FIG. 5A provides an illustration of a suitable construction of a light sensor that is suitable for use in a device according to FIG. 1A through FIG. 4. FIG. 5A can represent a cross section of the device shown in FIG. 1A taken along the line labeled E in FIG. 1A. The light sensor 26 is configured to convert the light signal to an electrical signal. Accordingly, the light signal can be employed to detect receipt of light signals. For instance, the light sensor 26 can be employed to measure the intensity of a light signal and/or power of a light signal.

The light-absorbing medium 32 of the light sensor 26 is positioned on a seed portion 34 of the light-transmitting medium 18. The seed portion 34 of the light-transmitting medium 18 is positioned on the base 20. In particular, the seed portion 34 of the light-transmitting medium 18 contacts the insulator 24. The seed portion 34 of the light-transmitting medium 18 can be continuous with the light-transmitting medium 18 included in the waveguide 16 or spaced apart from the waveguide 16. When the light signal enters the light sensor, a portion of the light signal can enter the seed portion 34 of the light-transmitting medium 18 and another portion of the light signal enters the light-absorbing medium 32. Accordingly, the light-absorbing medium 32 can receive only a portion of the light signal. In some instances, the light sensor can be configured such that the light-absorbing material receives the entire light signal.

During the fabrication of the device, the seed portion 34 of the light-transmitting medium 18 can be used to grow the light-absorbing medium 32. For instance, when the light-transmitting medium 18 is silicon and the light-absorbing medium 32 is germanium, the germanium can be grown on the silicon. As a result, the use of the light-transmitting medium 18 in both the waveguides 16 and as a seed layer for growth of the light-absorbing medium 32 can simplify the process for fabricating the device.

During operation of the light sensor 26, a reverse bias electrical field is applied across the light-absorbing medium 32. When the light-absorbing medium 32 absorbs a light signal, an electrical current flows through the light-absorbing medium 32. As a result, the level of electrical current through the light-absorbing medium 32 indicates receipt of a light signal. Additionally, the magnitude of the current can indicate the power and/or intensity of the light signal. Different light-absorbing medium 32 can absorb different wavelengths and are accordingly suitable for use in a sensor 26 depending on the function of the sensor 26. A light-absorbing medium 32 that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm.

The light sensor can be configured to apply an electric field to the light-absorbing medium 32 that is substantially parallel to the base 20. For instance, the light-absorbing medium 32 can include lateral sides 35 that connect a bottom side 36 and a top side 37. The bottom side is located between the top side and the base 20. In some instances, the lateral sides are substantially perpendicular relative to the base 20.

The lateral sides of the light-absorbing medium 32 can include doped regions 40. As is evident from FIG. 1B, each of the doped regions 40 can extend up to the top side of the light-absorbing medium 32. Each of the doped regions 40 can be an N-type doped regions or a P-type doped region. For instance, each of the N-type doped regions can include an N-type dopant and each of the P-type doped regions can include a P-type dopant. In some instances, the light-absorbing medium 32 includes a doped region 40 that is an N-type doped region and a doped region 40 that is a P-type doped region. The separation between the doped regions 40 in the light-absorbing medium 32 results in the formation of PIN (p-type region-insulator-n-type region) junction in the light sensor 26.

In the light-absorbing medium 32, suitable dopants for N-type regions include, but are not limited to, phosphorus and/or arsenic. Suitable dopants for P-type regions include, but are not limited to, boron. The doped regions 40 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

The light-transmitting medium 18 also includes doped regions 42. Each doped region 42 in the light-transmitting medium 18 contacts one of the doped regions 40 in the light-absorbing medium 32. A doped region 42 in the light-transmitting medium 18 and the contacted doped region 40 are the same type of doped region. For instance, when a doped region 40 in the light-absorbing medium 32 is a P-type region, that doped region 40 contacts a P-type doped region in the light-transmitting medium 18. As a result, in some instances, one of the doped regions 42 in the light-transmitting medium 18 is a P-type doped region and one of the doped regions 42 in the light-transmitting medium 18 is an N-type doped region.

In the light-transmitting medium 18, suitable dopants for N-type regions include, but are not limited to, phosphorus and/or arsenic. Suitable dopants for P-type regions include, but are not limited to, boron. The doped regions 42 are doped so as to be electrically conducting. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Each doped region 42 in the light-transmitting medium 18 is in contact with an electrical conductor 44 such as a metal. Accordingly, the each of the doped regions 42 in the light-transmitting medium 18 provides electrical communication between an electrical conductor 44 and one of the doped regions 40 in the light-absorbing medium 32. As a result, electronics can be employed to apply electrical energy to the electrical conductors 44 in order to apply the electric field to the light-absorbing medium 32. As is evident from the arrows labeled E in FIG. 1B, the doped regions 40 in the light-absorbing medium 32 serve as the field sources for the electrical field. As a result, the resulting electrical field is substantially parallel to the base 20.

Figure 5B:
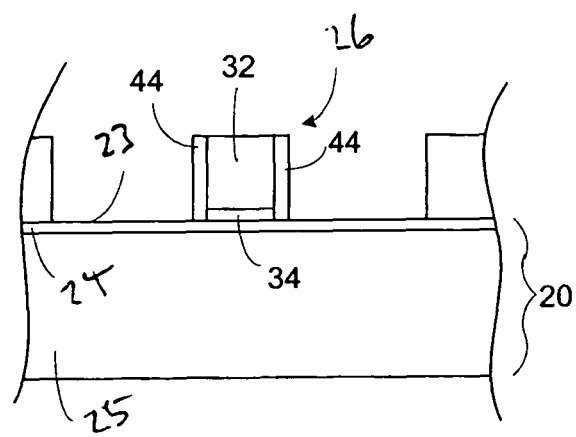

Rather than using doped regions 40 in the light-absorbing medium 32 as the field sources, electrical conductors 44 such as metal can be used as the field sources. For instance, FIG. 5B is a cross-section of a light sensor that employs electrical conductors 44 as field sources. The electrical conductors 44 extend from the base 20 to the top side of the light-absorbing medium 32. For instance, FIG. 5B illustrates the electrical conductors 44 extending from the insulator 24 to the top side of the light-absorbing medium 32. The seed portion 34 of the light-transmitting medium 18 is between the base 20 and the light-absorbing medium 32.

Figure 5C:
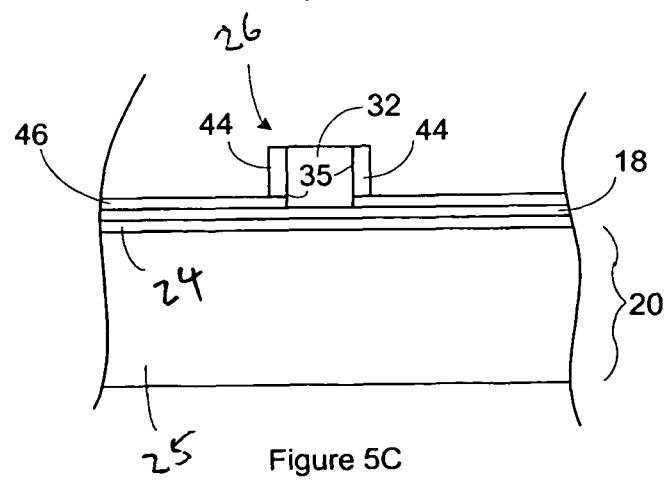

As is evident from FIG. 5B, the electrical conductors 44 can contact the base 20. However, the electrical conductors 44 can be spaced apart from the base 20 as illustrated in FIG. 5C. In FIG. 5C, a spacer layer 46 is formed on top of the light-transmitting medium 18 and against the lateral sides of the light-absorbing medium 32. The electrical conductors 44 extend from the top of the spacer layer 46 to the top side of the light-absorbing medium 32. As a result, the spacer layer 46 elevates the bottom of the electrical conductors 44 relative to the base 20. The electrical conductors 44 are also elevated above the interface between the light-absorbing medium 32 and the seed portion 34 of the light-transmitting medium 18. The elevation of the electrical conductors 44 reduces interaction between the resulting electrical field and the interface between the light-absorbing medium 32 and the seed portion 34 of the light-transmitting medium 18. This reduced interaction further reduces the level of dark current associated with the light sensor.

FIG. 5D presents another constructions of the light sensor that can simplify the fabrication process. A ridge 22 of light-absorbing medium 32 extends upward from a slab region of the light-absorbing medium 32. The slab region of the light-absorbing medium 32 and the ridge 22 of the light-absorbing medium 32 are both positioned on a seed portion 34 of the light-transmitting medium 18. As a result, the seed portion 34 of the light-transmitting medium 18 is between the light-absorbing medium 32 and the base 20. The light-absorbing medium 32 can be grown on the seed portion of the light-transmitting medium 18.

The doped regions 40 of the light-absorbing medium 32 are positioned on the lateral sides of the ridge 22 of the light-absorbing medium 32. The doped regions 40 extends from the ridge 22 into the slab region of the light-absorbing medium 32. The transition of a doped region 40 from the ridge 22 of the light-absorbing medium 32 into the slab region of the light-absorbing medium 32 can be continuous and unbroken as is evident from FIG. 5D.

Electrical conductors 44 are positioned on the slab region of the light-absorbing medium 32. In particular, the electrical conductors 44 each contact a portion of a doped region 40 that is in the slab region of the light-absorbing medium 32.

The arrangement of FIG. 5D may have a simplified fabrication process relative to an arrangement such as illustrated in FIG. 5B. For instance, in FIG. 5B, doped regions 40 are formed in the light-transmitting medium 18 and also in the light-absorbing medium 32. Different conditions may be required to form these regions in the different materials. For instance, when the light-transmitting medium 18 is silicon and the light-absorbing medium 32 is germanium, it may be desirable to use different temperatures to form the doped regions 40 in the light-absorbing medium 32 than is used to form the doped regions 42 in the light-transmitting medium 18. However, since the arrangement of FIG. 5D requires that the doped regions be formed only in the light-absorbing medium, the arrangement of FIG. 5B may be simpler to fabricate.

Although FIG. 5D illustrates each of the doped regions extending only part way into the light-absorbing medium included in the slab regions, one or more of the doped regions can extend through the light-absorbing medium. Accordingly, one or more of the doped regions can contact the light-transmitting medium 18. Further, one or more of the doped regions can extend through the light-absorbing medium and into the light-transmitting medium 18.

Increasing the portion of the lateral side that is contacted by the field source can increase the efficiency of the light sensor. Accordingly, as is evident in FIG. 5A and FIG. 5B, each of the field sources can span the distance between the top of the lateral side contacted by the field source and the bottom of the lateral side contacted by the field source. In some instances, each of the field sources extends from the top of the lateral side contacted by the field source toward the base 20. Alternately, each of the field sources can extend toward the base 20 from a location that is above 90% of a distance between the top of the lateral side contacted by the field source and the bottom of the lateral side contacted by the field source. Each of the field sources can extend toward the base 20 from a location that is above 80% of a distance between the top of the lateral side contacted by the field source and the bottom of the lateral side contacted by the field source. In one example, each of the field sources extends toward the base 20 from a location that is within 1.0 □m of a top of the lateral side contacted by that field source.

Figure 6:
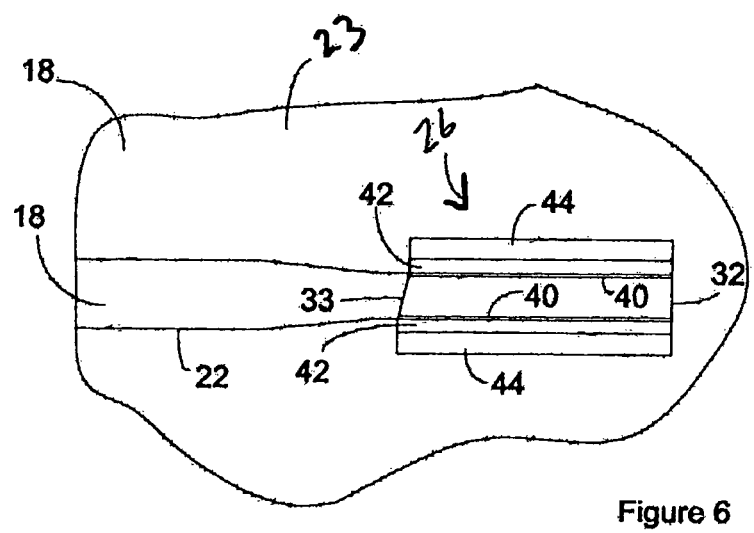
FIG. 6 represents a topview of the interface between a light sensor constructed according to FIG. 5A and a transition waveguide constructed according to FIG. 1A through FIG. 1D.

FIG. 6 illustrates a suitable interface between the transition waveguide 27 and the light sensor. For instance, in some instances, FIG. 6 represents a topview of the interface between a light sensor constructed according to FIG. 5A and a transition waveguide 27 constructed according to FIG. 1A through FIG. 1D. There is an interface 33 between a facet of the light-absorbing medium 32 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

As is also evident in FIG. 6, the ridge of the transition waveguide 27 tapers to the thickness between the lateral sides of the light-absorbing medium 32 (i.e. the distance between the outermost sides of the doped regions 40). Accordingly, the lateral sides of the ridge 22 of the transition waveguide 27 can be aligned with the outermost sides of the doped regions 40. However, the ridge of the transition waveguide 27 can optionally taper to the thickness of the light-absorbing medium 32 without the doped regions 40. Accordingly, the lateral sides of the ridge 22 of the transition waveguide 27 can be aligned with lateral sides of the portion of the light-absorbing medium 32 that excludes the doped regions 40 (or the innermost sides of the doped regions 40). In this instance, the entire light signal portion received by the light sensor is received by the undoped portions of the light-absorbing medium 32.

In some instance, at the interface between each transition waveguide 27 and the associated light sensor, the top of the ridge of each transition waveguide 27 is aligned or substantially aligned with the top of the ridge of light-absorbing medium 32. Alternately, the top of the ridge of light-absorbing medium 32 can be below the top of the ridge of the associated transition waveguide 27. These arrangements can reduce optical loss at the interface.

The height of the ridge of the light-absorbing medium 32 in the light sensor (labeled H in FIG. 5A) can be matched to the height of the ridge of the waveguide 16 (labeled h in FIG. 1B) and/or to the height of the ridge of the transition waveguide 27. Accordingly, a suitable height of the ridge of the light-absorbing medium 32 in the light sensor includes, but is not limited to, heights greater than 1 μm, 2 μm, and 3 μm. A suitable width for the light-absorbing medium 32 (labeled W in FIG. 5A) includes, but is not limited to, widths greater than 0.3 μm, 0.5 μm, and 0.8 μm and/or less than 1, 2, or 3 μm. Suitable light-absorbing medium 32 dimension ratios (width of the waveguide 16: height of the waveguide 16) include, but are not limited to, ratios greater than 0.15:1, 0.5:1, and 0.75:1 and/or less than 0.25:1, 0.75:1, and 1:1. In order for the light sensors to provide the speeds that are desirable for use in telecommunications applications, the width for the light-absorbing medium 32 (labeled W in FIG. 5A) is generally less than 1.0 μm. In some instances, the ridge 22 of the light sensor is multimode in the vertical direction but single mode in the horizontal direction. Accordingly, in some instances, the light sensor is single mode in the horizontal direction while the waveguide 16 is multimode in the horizontal direction.

Although FIG. 6 represents a topview of the interface between a light sensor constructed according to FIG. 5A and a transition waveguide 27 constructed according to FIG. 1A through FIG. 1D, the interface at the light transmitting medium and light absorbing medium can be substantially the same as shown in FIG. 6 when the transition waveguide are constructed according to FIG. 2A through FIG. 4.

Additional details about the construction and operation of the above light sensors as well as other light sensors can be found in U.S. patent application Ser. No. 12/380,016, filed on Feb. 19, 2009, entitled "Optical Device Having Light Sensor Employing Horizontal Electrical Field," and incorporated herein in its entirety and also in U.S. patent application Ser. No. 12/584,476, filed on Sep. 4, 2009, entitled "Optical Device Having Light Sensor Employing Horizontal Electrical Field," and incorporated herein in its entirety. Another light sensor that is suitable for use as the light sensor of FIG. 1A through FIG. 4 and methods for fabricating the sensor are disclosed in U.S. patent application Ser. No. 12/589,501, filed on Oct. 23, 2009, entitled "System Having Light Sensor with Enhanced Sensitivity" and incorporated herein in its entirety. Another light sensor that is suitable for use as the light sensor of FIG. 1A through FIG. 4 and methods for fabricating the sensor are disclosed in U.S. patent application Ser. No. 12/799,633, filed on Apr. 28, 2010, entitled "Optical Device Having Partially Butt-Coupled Light Sensor" and incorporated herein in its entirety.

The optical device can be constructed using fabrication technologies that are employed in the fabrication of integrated circuits, optoelectronic circuits, and/or optical devices. For instance, the ridge 22 for the waveguide 16, the transition waveguides 27 and/or the seed portion 34 can be formed in the light-transmitting medium 18 using etching technologies on a silicon-on-insulator wafer. A suitable method for forming the light sensors is disclosed in U.S. patent application Ser. No. 12/380,016, filed on Feb. 19, 2009, entitled "Optical Device Having Light Sensor Employing Horizontal Electrical Field," and incorporated herein in its entirety. Methods for fabricating waveguides on opposing sides of a vertical taper as disclosed in FIG. 2A through FIG. 4 are disclosed in U.S. patent application Ser. No. 10/236, 505, filed on Sep. 6, 2002, entitled "Optical Component Having Waveguides Extending from a Common Region," and incorporated herein in its entirety. Horizontal tapers can be readily formed using masking and etching technologies. Suitable methods for forming vertical tapers are disclosed in U.S. patent application Ser. No. 10/345,709, filed on Jan. 15, 2003, entitled "Controlled Selectivity Etch for Use with Optical Component Fabrication," and incorporated herein in its entirety.

The above arrangement of waveguide, transition waveguide 27, and one or more light sensors have a variety of applications. Of particular interest are applications where it is desirable to use multimode waveguides but still have light sensing capabilities at higher speeds. For instance, it is often desirable to use multimode waveguides when the waveguide has a high level of curvature because of the lower levels of optical loss. When it is desirable to have light sensing in these waveguides, the above arrangements can be employed. As an example, U.S. patent application Ser. No. 12/077,068, filed on Mar. 13, 2008, entitled "Optical Receiver for Use with Range of Signal Strengths," and incorporated herein in its entirety discloses a curved multimode waveguide that carries a light signal to a light sensor. It would be desirable to replace the light sensor in U.S. patent application Ser. No. 12/077,068 with the transition waveguides 27 and one or more light sensors arranged as disclosed above. Accordingly, an embodiment of the invention includes the optical receiver of U.S. patent application Ser. No. 12/077,068 but with the disclosed light sensor replaced with transition waveguides 27 and one or more light sensors arranged as disclosed above.

Another example of when the above arrangement is desirable is demultiplexers that make use of free space regions such as echelle gratings, star couplers, and/or Rowland circles. The demultiplexers often include output waveguides that carry the output of the demultiplexer directly away from the free space region. These output waveguides are often multimode waveguides in order to provide a flat top output. Additionally, each of these output waveguide often carries a light signal directly from the free space region to a light sensor. It would be desirable to replace one or more of these light sensors with transition waveguides 27 and one or more light sensors arranged as disclosed above. Accordingly, an embodiment of the invention includes an optical device having a demultiplexer that is located on a base and that includes output waveguides that each receives a light signal directly from a free space region that is located on the base and each of the output waveguides carries the light signal directly to transition waveguides 27 and one or more light sensors arranged as described above. Examples of demultiplexers that are formed on a silicon-on-insulator wafer and have output waveguides suitable for use with the transition waveguides 27 and one or more light sensors arranged as disclosed above include, but are not limited to, the demultiplexers disclosed in U.S. Provisional Patent Application Ser. No. 61/284723, filed on Dec. 23, 2009, entitled "Reducing Optical Loss in Reflective Optical Gratings," and incorporated herein in its entirety and in U.S. patent application Ser. No. 12/800,600, filed on May 18, 2010, entitled "Extension of Steps in Reflective Optical Gratings," and incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a main waveguide on a base and a component on the base, the main waveguide receiving a light signal directly from a free space region of the component and being configured to guide the light signal through a light-transmitting medium, the component being a demultiplexer,
transition waveguides on the base, each of the transition waveguide intersecting a terminal end of the main waveguide such that each transition waveguide receives a different portion of the light signal from the main waveguide; and
one or more light sensors positioned on the base, each transition waveguide guides the received light portion to the one or more light sensors such that each of the light signal portions is received at the one or more light sensors.

2. The device of claim 1, wherein each light signal portion includes the same selection of wavelengths.

3. The device of claim 1, wherein each transition waveguide does not intersect any waveguides other than the main waveguide.

4. The device of claim 1, wherein the main waveguide excludes free space where the light signal is unguided.

5. The device of claim 1, wherein each of the transition waveguides guides one of the light signal portions to a single one of the light sensors.

6. The device of claim 1, wherein at least portion of the transition waveguides include a horizontal taper.

7. The device of claim 1, wherein all of the light signal that exits the main waveguide through the terminal end of the main waveguide is received by the transition waveguides.

8. The device of claim 1, wherein the different light signal portions have different distributions of modes of the light signal.

9. The device of claim 1, wherein the different light signal portions have a different intensity of a fundamental mode of the light signal.

10. The device of claim 1, wherein the component is selected from a group consisting of an echelle grating, star coupler, and Rowland circle.

11. The device of claim 1, wherein the main waveguide is curved.

12. The device of claim 1, wherein the one or more light sensors are multimode in a vertical direction and single mode in a horizontal direction, the vertical direction being perpendicular to the base and the horizontal direction being perpendicular to the vertical direction.

13. The device of claim 12, where the one or more light sensors each includes a sensor waveguide configured to guide the light signal portion received by the light sensor through the light sensor, the sensor waveguides being multimode in a vertical direction and single mode in a horizontal direction, the vertical direction being perpendicular to the base and the horizontal direction being perpendicular to the vertical direction.

14. An optical device, comprising:
a main waveguide on a base, the main waveguide configured to guide a light signal through a light-transmitting medium;
transition waveguides on the base, each of the transition waveguide intersecting a terminal end of the main waveguide such that each transition waveguide receives a different portion of the light signal from the main waveguide;
one or more light sensors positioned on the base, each transition waveguide guides the received light portion to the one or more light sensors such that each of the light signal portions is received at the one or more light sensors; and
the one or more light sensors being multimode in a vertical direction and single mode in a horizontal direction, the vertical direction being perpendicular to the base and the horizontal direction being perpendicular to the vertical direction.

15. An optical device, comprising:
a main waveguide on a base and a component on the base, the main waveguide receiving a light signal directly from a free space region of the component and being configured to guide a light signal through a light-transmitting medium, the components being selected from a group consisting of an echelle grating, star coupler, and Rowland circle;
transition waveguides on the base, each of the transition waveguide intersecting a terminal end of the main waveguide such that each transition waveguide receives a different portion of the light signal from the main waveguide; and
one or more light sensors positioned on the base, each transition waveguide guides the received light portion to the one or more light sensors such that each of the light signal portions is received at the one or more light sensors.

16. An optical device, comprising:
a main waveguide on a base, the main waveguide configured to guide a light signal through a light-transmitting medium,
transition waveguides on the base, each of the transition waveguide intersecting a terminal end of the main waveguide such that each transition waveguide receives a different portion of the light signal from the main waveguide; and
one or more light sensors positioned on the base, each transition waveguide guides the received light portions to the one or more light sensors such that each of the light signal portions is received at the one or more light sensors and at least one of the one or more light sensors receives a light signal portion from more than one of the transition waveguides.

17. The device of claim 16, wherein each transition waveguide does not intersect any waveguides other than the main waveguide.

18. The device of claim 16, wherein the one or more light sensors are multiple light sensors and each of the transition waveguides guides one of the light signal portions to a single one of the light sensors.

19. An optical device, comprising:
a main waveguide on a base, the main waveguide configured to guide a light signal through a light-transmitting medium;
transition waveguides on the base, each of the transition waveguide intersecting a terminal end of the main waveguide such that each transition waveguide receives a different portion of the light signal from the main waveguide; and
one or more light sensors positioned on the base, each transition waveguide guides the received light portions to the one or more light sensors such that each of the light signal portions is received at the one or more light sensors,
one of the one or more light sensors includes
a ridge extending from slab regions, the slab regions being on opposing sides of the ridge,
a light-absorbing medium positioned to receive at least a portion of one of the light signal portions from one of the transition waveguides,
the light-absorbing medium being included in the ridge and also in the slab regions,
the light-transmitting medium and the light-absorbing medium being different materials, and
the light-absorbing medium including doped regions positioned such that an application of a reverse bias between the doped regions forms an electrical field in the light-absorbing medium included in the ridge.

* * * * *